United States Patent
Fishman et al.

(10) Patent No.: US 7,542,757 B2
(45) Date of Patent: Jun. 2, 2009

(54) METHOD, SYSTEM, AND COMPUTER PROGRAM PRODUCT FOR OVER-THE-AIR DOWNLOAD TO SATELLITE RADIO

(75) Inventors: David A. Fishman, Lakewood, NJ (US); Raymond K. Jones, Voorhees, NJ (US); Anthony J. Stillwell, Somerville, NJ (US); Eric E. Zhong, East Brunswick, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/993,303

(22) Filed: Nov. 19, 2004

(65) Prior Publication Data
US 2005/0202808 A1 Sep. 15, 2005

Related U.S. Application Data

(60) Provisional application No. 60/523,555, filed on Nov. 20, 2003.

(51) Int. Cl.
*H04M 3/00* (2006.01)
(52) U.S. Cl. ........................ 455/419; 455/418; 455/420; 375/316
(58) Field of Classification Search .............. 455/550.1, 455/419; 340/539, 573; 375/316; 725/132; 370/466, 352, 487; 342/357
See application file for complete search history.

(56) References Cited

U.S. PATENT DOCUMENTS

| | | | | |
|---|---|---|---|---|
| 6,477,179 | B1 * | 11/2002 | Fujii et al. | 370/466 |
| 7,400,292 | B2 * | 7/2008 | DiLellio | 342/357.02 |
| 2001/0024435 | A1 * | 9/2001 | Birdwell et al. | 370/349 |
| 2002/0152467 | A1 * | 10/2002 | Fiallos | 725/50 |
| 2003/0041335 | A1 * | 2/2003 | Patry et al. | 725/132 |
| 2003/0219081 | A1 * | 11/2003 | Sheehan et al. | 375/316 |
| 2004/0068721 | A1 * | 4/2004 | O'Neill et al. | 717/168 |
| 2005/0055595 | A1 * | 3/2005 | Frazer et al. | 713/400 |

* cited by examiner

*Primary Examiner*—Charles N Appiah
*Assistant Examiner*—Michael T Vu

(57) ABSTRACT

A content channel is periodically or permanently allocated for use as an "update channel" or "firmware-image download" channel. Any firmware images downloaded to receivers in the system are thoroughly tested prior to being distributed among the receivers. Header information is included in the firmware image when it is transmitted to the receivers, and the firmware image is not accepted for use by the receivers until it is verified on the receiver side. Further, rather than overwriting the existing firmware, the new validated firmware updates are stored separately on the receivers and are utilized when the receiver is rebooted during power-up or by the host controller. If, during this reboot process, an error occurs in the new firmware image, the receiver is configured to revert back to the original firmware image so that it will remain operational, albeit without the updated firmware features.

16 Claims, 5 Drawing Sheets

(Typical)

METHOD, SYSTEM, AND COMPUTER PROGRAM PRODUCT FOR OVER-THE-AIR DOWNLOAD TO SATELLITE RADIO

CROSS-REFERENCE TO RELATED APPLICATIONS

This application is based on and claims priority to U.S. Provisional Application No. 60/523,555, filed Nov. 20, 2003, incorporated fully herein by reference.

FIELD OF THE INVENTION

This invention relates to satellite radio and, more particularly, to a method, system, and computer program product for enabling software downloads, e.g., firmware, to unidirectional devices such as satellite radio receivers.

BACKGROUND OF THE INVENTION

Satellite radio is an emerging technology that is in the early stages of gaining consumer acceptance. Major electronics manufacturers such as Pioneer, Alpine, Clarion, Delphi, Sony, and Kenwood and automobile companies, such as General Motors and Ford, are partnering with satellite radio providers to bring satellite radio to the consumer. Satellite radio enables users to subscribe to a service by which high quality audio channels, free of the interference often accompanying traditional radio frequency (RF) broadcast systems, is available via satellite transmission. In addition, in vehicular use, satellite radio enables a vehicle equipped with the appropriate receiving equipment to hear the same channel regardless of the vehicle location, i.e., a vehicle can travel from New York to Los Angeles without losing the signal of a particular channel to which the receiving equipment is tuned.

Typically a satellite radio service provider utilizes at least two satellites, although a single satellite or more than two satellites may be used, depending upon the amount of coverage area desired. Additionally, the satellite radio provider may utilize terrestrial repeaters to improve broadcast coverage in areas of satellite signal blockage. The service provider selects content for each of the channels it broadcasts and combines them into one or more signals for transmission to the satellites and terrestrial repeaters, which retransmit the signals where they can be received by radio receivers possessed by subscribers. The signal can contain hundreds of channels, the actual number depending on the particular system bandwidth and channel compression and encoding parameters. The radio receivers are programmed to receive the signals and unscramble them so that the listener who has tuned to a particular channel can enjoy the content. Other information can be included in the broadcast signal. For example, information regarding the artist and title of a particular song being played can also be provided within the digital stream on the channel the user has tuned to, or through a shared service channel.

Satellite radio receivers utilize various combinations of software and firmware to facilitate receiving, tuning, playback and other functions. As is well known, firmware is the combination of a hardware device (e.g., a memory) and computer instructions or computer data (or software) that reside on the hardware device. The computer instructions/data are referred to as a "software image" or "firmware image". The software image is loaded into non-volatile memory so that the receiver can properly boot up when power is applied. When booted, the device is configured for use and ready to process external stimuli and perform the function it is intended for.

It should be noted that this disclosure is not limited to the efficient download of firmware images alone, but may be applied to any configuration image which is typically stored in non-volatile memory, such as the hardware configuration bit files for a Complex Programmable Logic Device (CPLD) or Field Programmable Gate Array (FPGA). CPLD and FPGA devices utilize a form of non-volatile memory, on or off-chip, to store the hardware configuration data.

This disclosure will use the term "firmware image" to refer to software, firmware, or hardware configuration data alike.

The end user or service provider may benefit from occasional software or firmware image updates. The non-volatile memory used to store the firmware image is often a flash device, which typically requires large blocks of memory to be erased before updating to a new firmware image. Therefore fail-safe mechanisms are required to insure that a faulty upgrade does not leave the product inoperable.

In wired devices and/or devices that can communicate in two directions (e.g., a client server environment, or a wireless network computer system), an uplink is available between the devices so that various acknowledgments can be sent back and forth between the devices to assure that downloads are successful and to let the sending side know when a problem occurred on the receiving side. In the event of a failure when flashing the memory on the client device, the client device can be queried by the server and responses (or lack thereof) can be analyzed by the server to determine the cause (or existence) of the problem. However, in receiver systems, and in particular, in a unidirectional receiver system such as a satellite radio system, the content provider has no way of knowing what is happening at the radio devices, which may be hundreds or thousands of miles away from the content provider. If a problem occurs in the radio itself, the radio may be completely useless and inaccessible to the content provider for repair, and the content provider will be unaware of this situation. This leaves the listener without a functional receiver and without recourse to resolve the problem.

Satellite radio systems include multiple content channels and at least one "service channel". The service channel provides various functionality to the satellite receiver. For example, it can be used to deliver information that is common to all channels, provide a channel "index" to assist the tuning process, carry content decryption keys and subscriber access control information, and provide additional low bit-rate data bandwidth. Information can be transferred to the satellite radio via the service channel without disrupting the content channels. However, the service channel is limited in that it transfers data much less efficiently than the content channels due to additional error detection and correction coding. Accordingly, use of the service channel to provide firmware image updates is very inefficient.

Accordingly, what is needed is an efficient manner to provide large software/firmware updates to unidirectional devices, such as satellite receivers in the field, in a fail-safe manner.

SUMMARY OF THE INVENTION

A content channel used for transmissions to a receiving device is periodically or permanently allocated for use as an "update channel" or "firmware-image download" channel. Before any firmware image is broadcast on the update channel, it is thoroughly lab tested with each vintage of receiver currently in service. Header information is included in the firmware image when it is transmitted to the receivers, and the firmware image is not actually on-line in the receiver until it is verified on the receiver side. Further, even after the image has been verified with checksum and other error detection methods, rather than overwriting the existing firmware, the new firmware updates are stored separately on the satellite receivers and are utilized when the satellite receiver is rebooted. If, during this reboot process, an error occurs in the new firmware image, the satellite receiver can be configured to revert back to the original firmware image so that it will remain operational, albeit without the updated firmware features. The present invention can be used with any receiving system and is particularly applicable, though not limited, to unidirectional receiving systems.

DETAILED DESCRIPTION OF THE PREFERRED EMBODIMENTS

Figure 1:
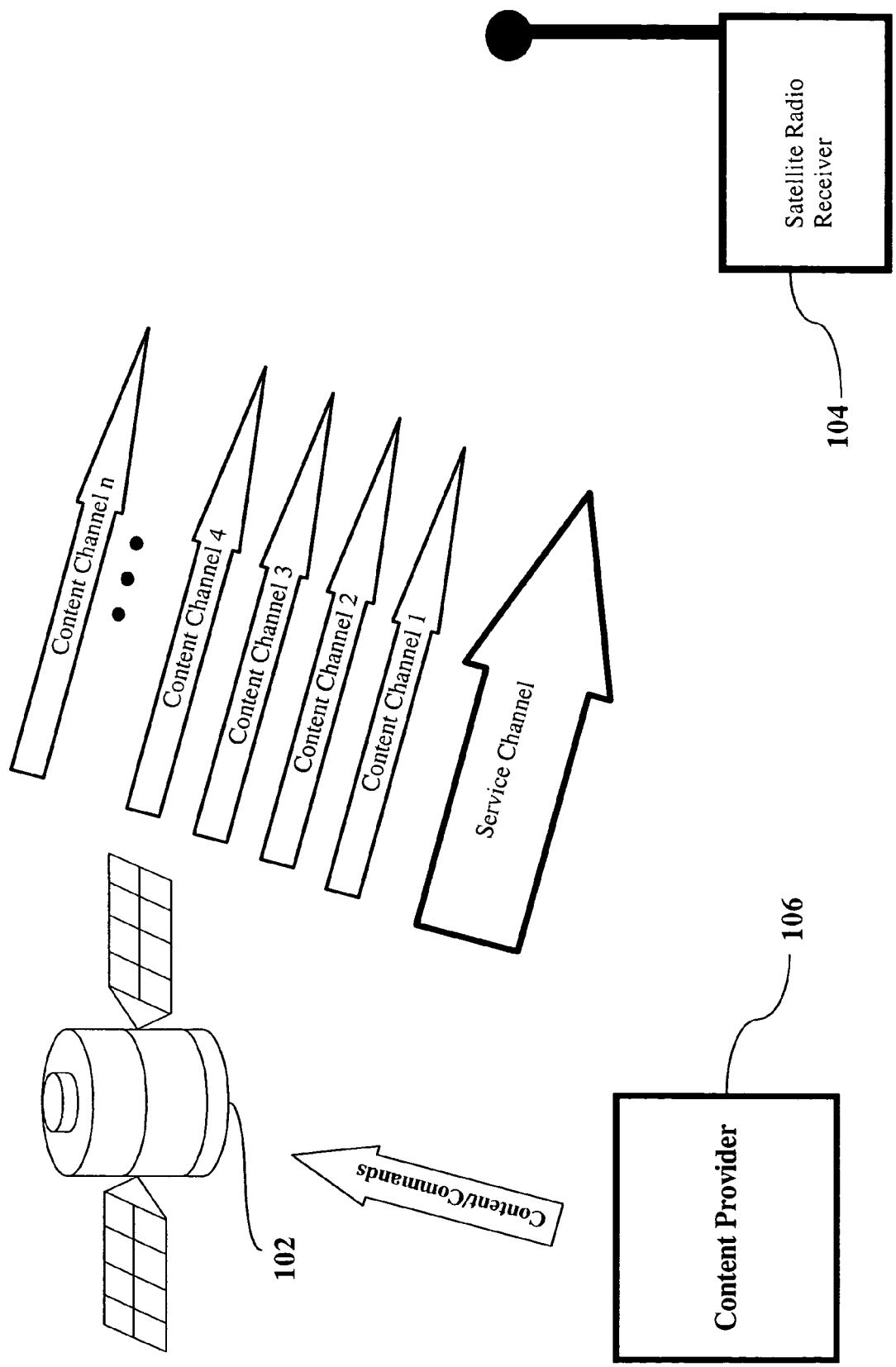
FIG. 1 illustrates in basic form the transmission of content in a satellite radio system.

FIG. 1 illustrates in basic form the transmission of content in a satellite radio system. A satellite system embodiment is described for the purpose of simplicity of explanation and it is understood that by describing such an embodiment the present invention is not limited to the described embodiment. Referring to FIG. 1, a satellite 102 transmits content (e.g., scheduled programming) over a series of channels to a satellite radio receiver 104. The content is provided by a content provider 106 as shown. In a typical system, there are multiple content channels 1, 2, 3, 4 ... N along with a service channel. The content channels provide the content delivered to the user of the satellite radio receiver 104, such as music, sports, news, or any other content delivered to a radio listener.

The service channel provides various functionality to the satellite radio receiver. For example, it can be used to deliver information that is common to all channels, provide a channel "index" to assist the tuning process, carry content decryption keys and subscriber access control information, and provide additional low bit-rate data bandwidth.

Figure 2:
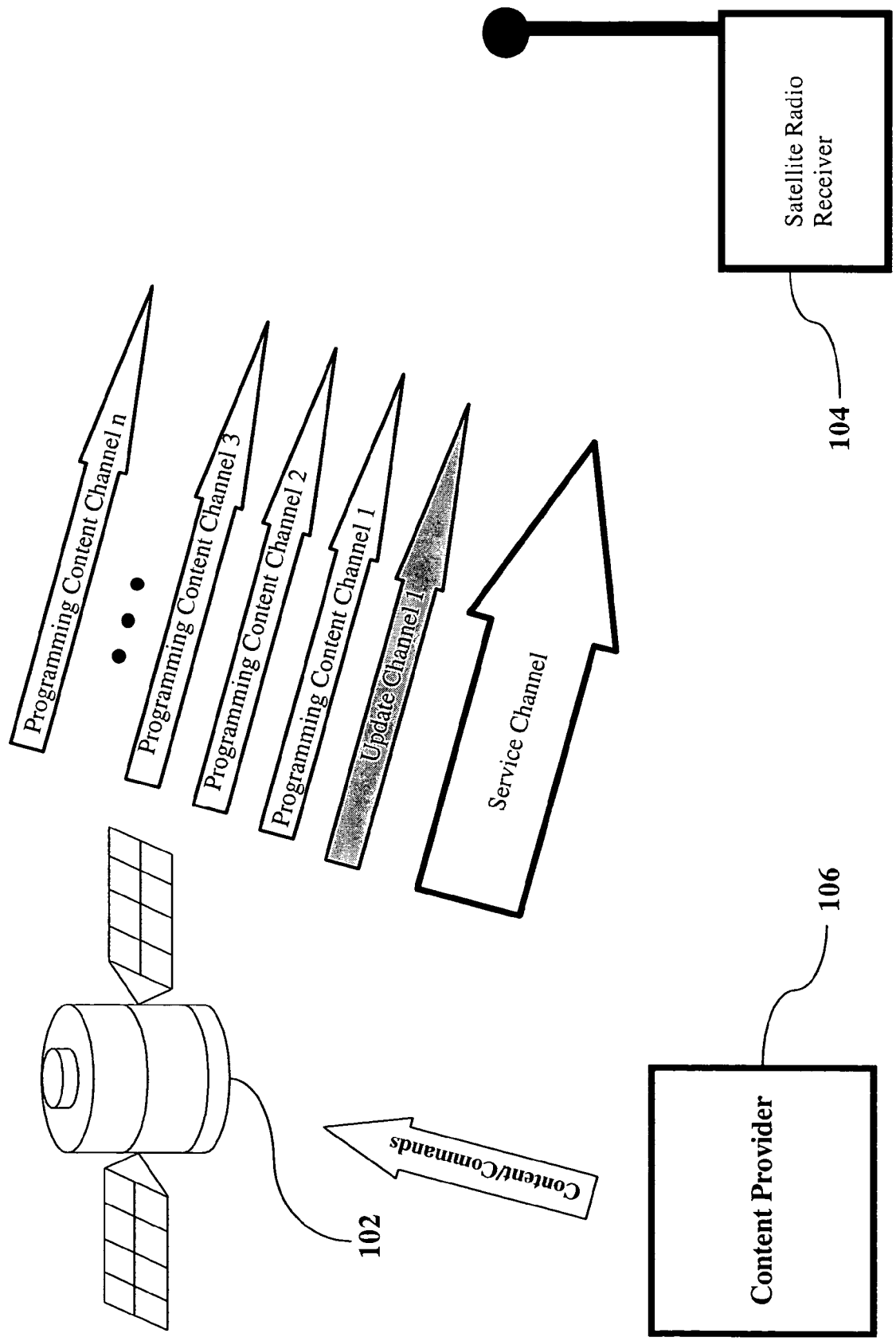
FIG. 2 illustrates a first embodiment of the present invention.

FIG. 2 illustrates a first embodiment of the present invention. The system illustrated in FIG. 2 is similar to the prior art system illustrated in FIG. 1. However, in the embodiment disclosed in FIG. 2, an update channel (in addition to content channels) is shown. The update channel (indicated by shading) is identical to the content channels, except that it is either exclusively used, or temporarily assigned, to carry updated information such as updated firmware images. The remainder of the content channels are programming content channels.

Figure 3:
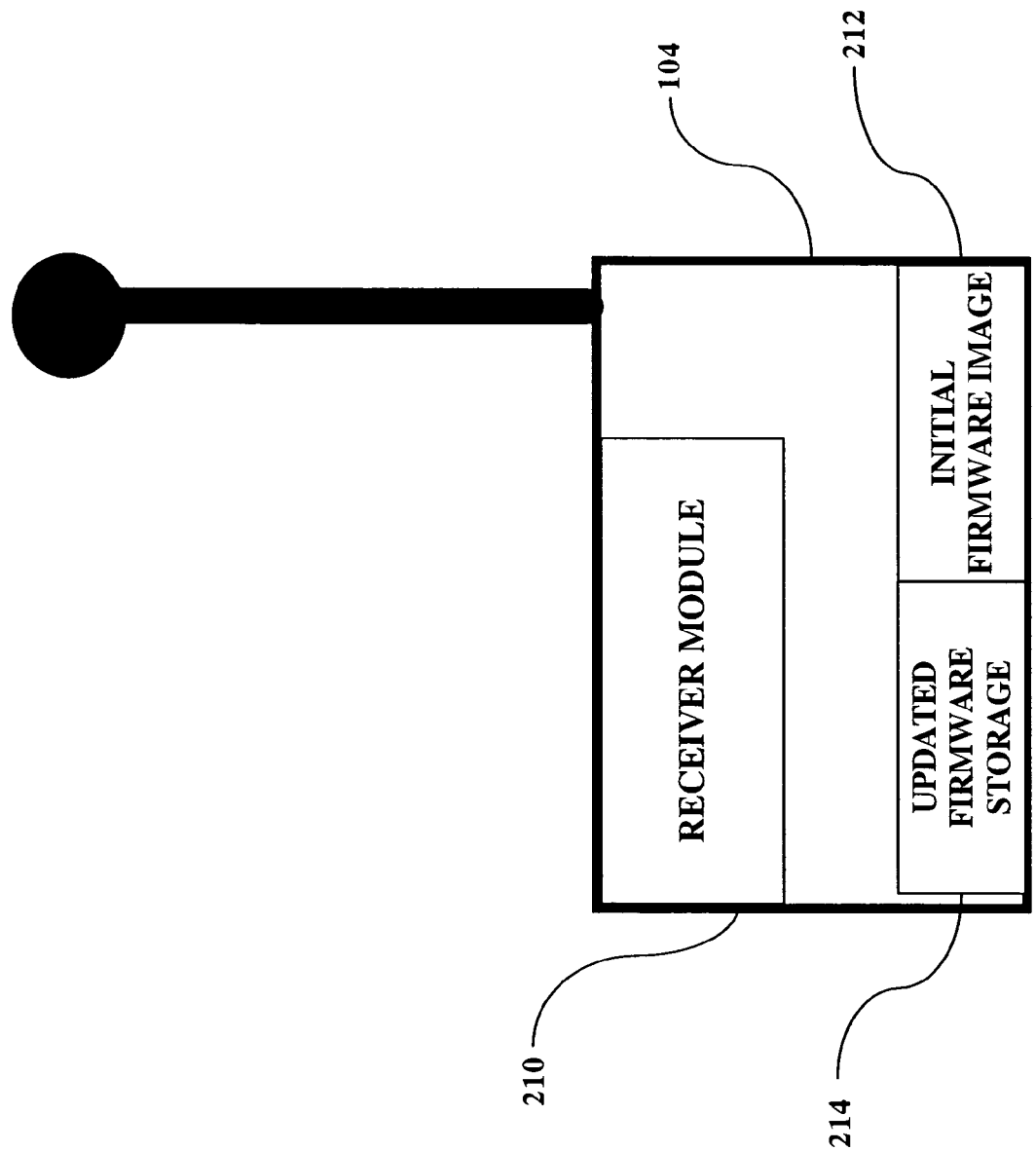
FIG. 3 is a more detailed block diagram of a satellite radio receiver configuration in accordance with the present invention.

FIG. 3 is a more detailed block diagram of a satellite radio receiver configured in accordance with the present invention. As shown in FIG. 3, the satellite radio receiver 104 includes a receiver module 210, an initial firmware image storage area 212, and an updated firmware image storage area 214.

The receiver module 210 simply represents the components of a typical satellite radio receiver utilized to perform and control its operations. Amplifiers, tuners and receivers, displays, etc. are all part of the receiver module 210. Such elements are well known in the art and are not further described herein.

Initial firmware image storage area 212 represents the typical non-volatile (e.g., flash, EEPROM, ROM, batter backed RAM, etc.) memory where the initial firmware image, installed on the device when it is placed in the field, is stored.

Updated firmware image storage area 214 is simply an available block in the non-volatile memory where the updated firmware image is downloaded to the radio in accordance with the present invention. As described in more detail below, when populated with a validated firmware image, the satellite radio will revert to the image stored in memory 214 upon boot up, thereby bypassing the initial firmware image 212. The means by which the receiver selects the latest (validated) firmware image are based on the most recent version number and are standard art.

Figure 4:
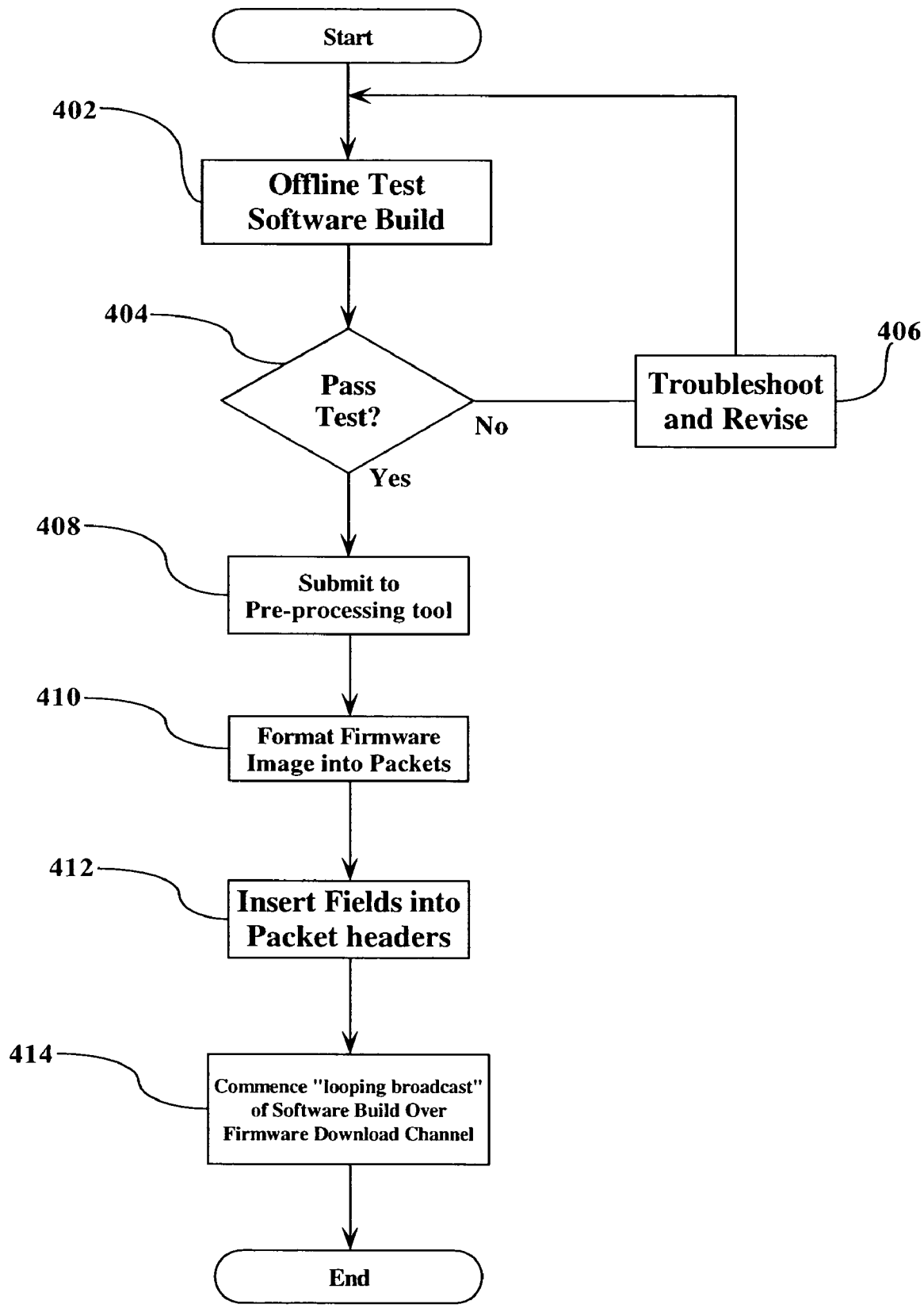
FIG. 4 is a flowchart illustrating the basic steps performed in preparing a software build, which will be the updated firmware image, and the process of getting this updated firmware image into a configuration ready for broadcast.

FIG. 4 is a flowchart illustrating the basic steps performed in preparing a software build, which will be the updated firmware image, and the process of getting this updated firmware image into a configuration ready for broadcast. At step 402, the software build is written and tested offline. This is simply the normal process utilized during software development. The offline testing provides a first line of defense against the implementation of faulty firmware into the field and thus onto the satellite receivers.

At step 404, a determination is made as to whether or not the offline testing has been successful. If the software testing has not been successful, the process proceeds to step 406 where the software is troubleshooted and revised, and then process reverts back to step 402 where initial offline testing continues. If, at step 404, it is determined that the software build has passed the test, it is then submitted to the "preprocessing tool" of the present invention. The preprocessing tool is described below.

Once the firmware build (e.g., encompassing DSP, ARM, or HOST code) has been offline tested and verified for a particular platform, it is prepared for broadcast using the preprocessing tool of the present invention, which, in a preferred embodiment, is a software program for performing the steps described below. The preprocessing tool formats the firmware image into a series of packets that can be independently received and tested for errors on each receiver.

The preprocessing tool inserts various fields into the packet headers to facilitate the overall assembly of the packet image at the receiver. A packet count field in the packet headers identifies the overall image size so that the progress of the download can be tracked at the receiver. A sequence number field is used to identify, at a packet level, which part of the overall image is contained in the packet. When all unique packets have been received, the download is complete. Image version and platform fields are used to identify the target radio(s) for the packet. An address field specifies exactly where in the final flash image the data within the packet is intended to go.

The use of an address field in the packet header provides some limited "free" compression. In firmware images, there are often blocks of data which are initialized to zero. This data does not have to be sent to the receiver; the preprocessing tool need only skip over it by terminating the packet early and starting the next packet at the address following the zero block.

In addition, by identifying the target radio(s) in this way, at the packet level, it is possible to interweave multiple streams of firmware on the same channel. The receiver of each radio is programmed to retain only those packets that match its needs, while throwing away (without error) any other packets that it may receive. These "thrown away" packets may be useful to other radios simultaneously tuned to the same broadcast; thus, they are not removed completely from the broadcast on a global basis.

Because the firmware image is distributed among many small self-described packets, the receiver can "tune into" the download at any point in the sequence (it does not have to wait for the first numbered packet). This minimizes the download time, since the basic requirement for completion is that all packets of a given image have been successfully received. Similarly, if a receiver experiences a momentary loss of signal, the missed packet gets picked up on the next cycle of the overall image. Packets that are received intact are retained until all packets have been received error-free.

The preprocessing tool also adds an overall image header, always fit into the first packet, to identify the overall components of the image. Also, within this header is a signature field that is used to verify the authenticity of the image.

At step 414, once the firmware image has been formatted into packets (step 410) and the fields have been inserted into the packet headers (step 412), at step 414 the looping broadcast is commenced of the software build over the firmware download channel.

Figure 5:
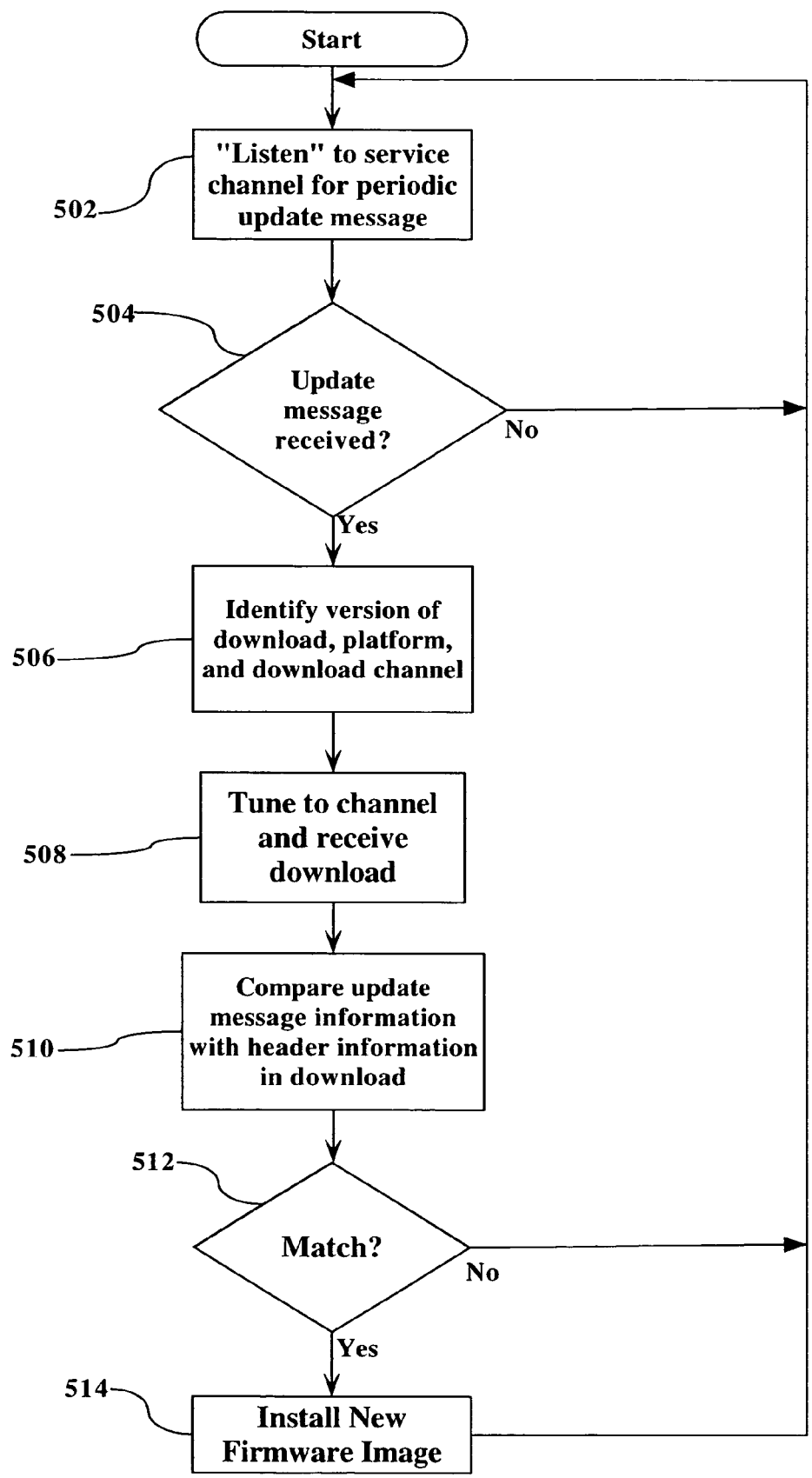
FIG. 5 is a flowchart illustrating the operation of the present invention from the perspective of a receiver.

FIG. 5 is a flowchart illustrating the operation of the present invention from the perspective of a receiver. At step 502, the satellite receiver "listens" to the service channel for receipt of a message that informs the receivers about the upgrade. At step 504, a determination is made as to whether or not an update message has been received. If not, the process proceeds back to step 502, and the receiver continues to listen to the service channel for an update message.

If at step 504, an update message indicating the availability of new firmware is received, at step 506, the version, platform, and download channel of the new firmware is identified from the header information. At step 508, the receiver is tuned (automatically as a "forced" upgrade, or manually by the user who elects to accept an upgrade) to the download channel to receive the download. At step 510, the update message information is compared with the header information in the download to make sure that there is a match between the software that is supposed to have been downloaded and the software that was actually downloaded. If there is not a match, this indicates an error and the process proceeds back to step 502 and listens for a new update message.

If, at step 512, it is determined that there is a match between the update message information and the header information in the download, then at step 514 the new firmware image is installed and implemented, and the process proceeds back to step 502 to listen for new update message messages.

The following description describes an embodiment of the present invention with a specific implementation in mind. It is understood that what is disclosed here is the combination of procedures which when implemented together create an efficient and fail-safe means to download product software or hardware updates. This description is provided for purposes of example only and that the present invention is not limited to the described embodiment or to satellite receivers per se.

Satellite radios incorporating the present invention can update their firmware automatically in the field. The design is such that the radio can recover from any state, including possibly the worst case—where the service provider accidentally offers a "bad" image for download.

The process for an Over The Air (OTA) update begins following the offline-testing phase, where the new DSP, ARM or HOST image is verified to properly perform the desired function. The upgrade process can be verified using a back-up Studio Broadcast System (SBS) system (or equivalent).

Once testing is complete, the new image is then placed on the primary SBS. A GUI for controlling the SBS can initiate the streaming of the image on one (or more) low bit-rate audio channel(s). The bit rate allocation for such channels ultimately determine the update time. As an example, at 8 kbps, a typical 120 kbyte update should be complete in about 2 minutes. The bit rate can be adjusted relative to the proximity of the code release or time of day, etc. The user need only maintain a download connection for enough time to receive one copy of the entire image in order to update the firmware.

A cluster of bandwidth is borrowed from within the service providers' audio bandwidth rather than the limited service channel stream. The audio stream section of the broadcast transfers data much more efficiently than the more heavily error correction coded service channel. Although downloads cannot occur while the end user listens to audio (except in cases where the service provider forces an update), firmware updates are infrequent enough to allow for a brief interruption in service in order to gain the new improvement.

The design is compatible with the existing system, which does not provide for the firmware download feature. Existing radios are unable to tune to such channels since the firmware download channel will use a unique "coder ID", which is not supported. Thus, implementation of the new system will not have a negative impact on existing system hardware.

It should be noted that multiple images may be streamed if there are multiple products requiring different upgrade images. The transmitted stream is packetized to allow for simultaneous streams and also to minimize the delay required to receive an update.

In an automated version of the system, SBS transmits new "firmware update available (FUA)" service channel messages to inform receivers about the upgrade. The new service channel message identifies the channel where the upgrade may be accomplished, the length of the download, firmware version and platform information, as well as other image identification and consistency verification details.

Receivers never overwrite their initial firmware image, so it is always possible to roll back to a working version. From there, it is always possible to retry the firmware download.

The system can be implemented in a variety of ways. In the simplest (to implement) "manual" scheme, the user tunes to a published "firmware download" channel for updates. A more advanced implementation of the system makes the upgrade process remote controlled, requiring no user intervention. The Radio Manufacturer "OEM" host processor may also be a partner in such a system, allowing for user interaction, confirmation and system roll back if, for example, there was something wrong with the broadcast image or the upgrade was optional.

The "manual" scheme allows radios to incorporate the feature very early in the design process. Using this method, the changes necessary to support OTA download may be retrofitted into current production radios. The manufacturing partners would only need to update their firmware image in order to take advantage of the new OTA download capabilities.

Firmware update images may target a variety of radio platforms. The system can be configured to support radios that have the ability to update only their DSP (audio algorithm) code, ARM (control) code, or HOST (OEM) firmware. Radios are classified according to a "platform" identifier, which is used to group radios in terms of their firmware compatibility.

For example, it is possible that a radio that can update its ARM and DSP code will share the same platform identifier as an older radio that can update its DSP code only. This can happen when the same DSP code is able to run in a compatible manner with newer controller code. In accordance with the present invention, the older radio will allow the update, so long as the platform ID of the image matches the platform ID of the radio. However, in this case, the older radio would ignore the part of the image relative to the ARM processor.

Once a firmware build (encompassing DSP, ARM and HOST code) has been offline tested and verified for a platform, it is prepared for broadcast using the preprocessing tool (program) of the present invention, described above. The resulting image is placed on the SBS system for broadcast on the firmware download channel. The SBS system loops the file endlessly so that receivers can pick up the update when they are turned on.

SBS software modifications are implemented to enable channel(s) for firmware download purposes. In the "remote control" version of the system, SBS sends periodic update messages in its service channel which "offer" the down load image to compatible receivers. These update messages would inform receivers of the version and platform, where to find the download (which channel) and other image consistency fields.

In order to insure that the receiver gets the proper download image, the information in the update message is compared to the information in the combined image header before flashing the update. This comparison further protects against the case where the service provider updates the image file while some radios are in the process of downloading a previous image file. The consistency information within the image is guaranteed to change with a new version of firmware.

An additional update message commands receivers to "roll back" the firmware to their original image. This message is used as a sort of global reset, in case a mistake was made in a given platform (or group of platforms). Using the version and platform fields, specific groups of radios can be addressed with this command. All receivers within all platforms can be addressed with a single message.

To assure that the "officially tested" image is the one broadcast, a "key" file can accompany the approved image. SBS will insure that the key file matches the image file before accepting the new file for broadcast. Only images approved for broadcast (by the test team) are assigned a key, so unauthorized users cannot synthesize their own "patched" image for malicious purposes.

It is also contemplated that the present invention can include an authentication (e.g., password protected) process for enabling firmware channels. The authorizing party checks that the correct files are installed on the SBS system prior to enabling the broadcast of the new firmware image.

The firmware image data is transmitted in an ordinary physical channel (i.e., a content channel), alongside other audio channels. The data headers match those used for one of the audio compression algorithms, but the payload information is different. There is no risk that the firmware update data will be "played" as audio because the descriptive information associated with the download channel will use a unique, descriptive ID. The data on the firmware update channel is the looped file prepared by the preprocessing tool described earlier.

In the "manual" method for initiating a download, the customer simply "tunes" to the download channel, perhaps as advertised on the user interface display. The user interface display becomes the status console, giving progress information. If the customer already has the latest version of software offered for his platform, no update will occur. The customer may always "tune away" from the download.

The receiver will only collect a download firmware image if the offered version is greater than the current version and there is a match in platform. Once all packets have arrived, the receiver verifies the consistency of the overall firmware image by performing a signature check of the image as compared to the signature placed in the combined image header.

The firmware image is flashed only if the signature matches. The flashing process does not begin until this point, so as to minimize the chance that the receiver will be powered off during the flashing process. This "window of vulnerability" is relatively short and depends on the flash device write time (typically less than one second). If the receiver is powered off during the flashing process, on the next power-on-reset the firmware will revert to the original firmware image. This original firmware image will then be able to download the update. The user interface display is used to encourage the user to leave the radio powered until the update process is completed.

There are a number of safety mechanisms that may be built into the design to avoid problem downloads. First, the service provider system incorporates forward error correction (e.g., Reed Solomon error correcting codes), which is used to correct errors to a background bit error rate. However, in almost all cases, even if a Reed Solomon block cannot be corrected, it is at least flagged as having erred bits. The firmware automatically waits until the packet is retransmitted on the next loop of the file.

The "preprocessing" tool generates a series of packets, each with their own 32-bit CRC that extends the system error detection capacity. Any packet not matching the CRC is rejected. The same "preprocessing" tool generates an overall image signature. If that does not match, the whole image is rejected.

There are also a number of consistency checks that can invalidate the received image. For example, if the "version", "platform" or "packet length" field changes during the download, the image is rejected and the download is automatically restarted. Also, if the "version", "platform", "image length" or "signature" fields do not match between the packet header, composite image header or update message, the image is rejected.

Finally, if a bad image still manages to get flashed into a receiver, it is possible, as described above, to roll back the firmware to the original image in a number of ways:

1) In an automated system, via SBS control using a service channel message;

2) Via radio manufacturer host controller using a command to erase the update section of the receiver flash memory;

3) In cases where the receiver is unresponsive, by holding a reserved pin in a defined state (low or high) for a short while after reset is released.

The third case above is a "fail safe" method for restoring operation following the download of an utterly broken (but consistent) image.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation operated by the content provider and/or in a storage device accessible by a receiving device. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of updating software on a satellite signal receiving device, comprising:
    allocating a satellite channel receivable by said satellite signal receiving device for use as an update channel;
    preprocessing updated software to be transmitted from a satellite over said allocated satellite channel to enable independent testing by and deployment on said satellite signal receiving device;
    transmitting an update message to said satellite signal receiving device providing directions for receiving said updated software; and
    configuring said satellite signal receiving device, upon receipt of said update message, to receive, test, and deploy said updated software,
    wherein said testing by said satellite signal receiving device comprises at least one consistency check to determine whether said received updated software is valid;
    wherein said updated software comprises an updated firmware image; and
    wherein the method further comprises the steps of:
    storing said updated firmware image in a storage area of said satellite signal receiving device different from a storage area of an original firmware image stored on said satellite signal receiving device;
    verifying and testing said updated firmware image prior to enabling it for operation;
    if said verifying and testing step indicates a proper and functioning updated software image, automatically enabling said updated firmware image for operation on said satellite signal receiving device; and
    if said verifying and testing step indicates an improper or faulty updated software image, automatically enabling said satellite signal receiving device to operate using said original firmware image.

2. The method of claim 1, wherein said preprocessing includes:
    formatting said updated software into packets;
    inserting fields into packet headers, said packet headers facilitating assembly of said packets after they are received at the satellite signal receiving device.

3. The method of claim 1, wherein said update message includes:
    an instruction indicating the availability of said updated software; and
    identification of one or more satellite channels from which the updated software can be downloaded.

4. The method of claim 1, wherein said update message includes:
    information regarding the size of the updated software;
    identification of a version of the updated software;
    identification of a platform on which the updated software will operate; and
    verification details.

5. The method of claim 1, wherein said updated software comprises interwoven, multiple firmware updates, said satellite signal receiving device configured to retain only firmware updates that match its needs.

6. The method of claim 1, wherein said consistency check comprises comparing data derived from the received updated software with data derived from the received update message.

7. A system of updating software on a satellite signal receiving device, comprising:
    means for allocating a satellite channel receivable by said satellite signal receiving device for use as an update satellite channel;
    means for preprocessing updated software to be transmitted over said allocated satellite channel to enable independent testing by and deployment on said satellite signal receiving device;
    means for transmitting an update message to said satellite signal receiving device providing directions for receiving said updated software; and
    means for configuring said satellite signal receiving device, upon receipt of said update message, to receive, test, and deploy said updated software,
    wherein said testing by said satellite signal receiving device comprises at least one consistency check to determine whether said received updated software is valid;
    wherein said updated software comprises an updated firmware image; and
    wherein the system further comprises:
    means for storing said updated firmware image in a storage area of said satellite signal receiving device different from a storage area of an original firmware image stored on said satellite signal receiving device;
    means for verifying and testing said updated firmware image prior to enabling it for operation;
    means for automatically enabling said updated firmware image for operation on said satellite signal receiving device if said verifying and testing means indicates a proper and functioning updated software image; and
    means for automatically enabling said satellite signal receiving device to operate using said original firmware image if said verifying and testing means indicates an improper or faulty updated software image.

8. The system of claim 7, wherein said preprocessing means includes:
   means for formatting said updated software into packets;
   means for inserting fields into packet headers, said packet headers facilitating assembly of said packets after they are received at the satellite signal receiving device.

9. The system of claim 7, wherein said update message includes:
   an instruction indicating the availability of said updated software; and
   identification of one or more satellite channels from which the updated software can be downloaded.

10. The system of claim 7, wherein said update message includes:
    information regarding the size of the updated software;
    identification of a version of the updated software;
    identification of a platform on which the updated software will operate; and
    verification details.

11. The system of claim 7, wherein said consistency check comprises comparing data derived from the received updated software with data derived from the received update message.

12. A computer program product for updating software on a satellite signal receiving device, the computer program product comprising a computer-readable storage medium having computer-readable program code embodied in the medium, the computer-readable program code comprising:
    computer-readable program code that allocates a satellite channel receivable by said satellite signal receiving device for use as an update satellite channel;
    computer-readable program code that preprocesses updated software to be transmitted from a satellite over said allocated channel to enable independent testing by and deployment on said satellite signal receiving device;
    computer-readable program code that transmits an update message to said satellite signal receiving device providing directions for receiving said updated software; and
    computer-readable program code that configures said satellite signal receiving device, upon receipt of said update message, to receive, test, and deploy said updated software,
    wherein said testing by said satellite signal receiving device comprises at least one consistency check to determine whether said received updated software is valid;
    wherein said updated software comprises an updated firmware image; and
    wherein the computer program product further comprises:
    computer-readable program code that stores said updated firmware image in a storage area of said satellite signal receiving device different from a storage area of an original firmware image stored on said satellite signal receiving device;
    computer-readable program code that verifies and tests said updated firmware image prior to enabling it for operation;
    computer-readable program code that automatically enables said updated firmware image for operation on said satellite signal receiving device if said verifying and testing indicates a proper and functioning updated software image; and
    computer-readable program code that automatically enables said satellite signal receiving device to operate using said original firmware image if said verifying and testing indicates an improper or faulty updated software image.

13. The computer program product of claim 12, wherein said computer-readable program code that preprocesses includes:
    computer-readable program code that formats said updated software into packets;
    computer-readable program code that inserts fields into packet headers, said packet headers facilitating assembly of said packets after they are received at the satellite signal receiving device.

14. The computer program product of claim 12, wherein said update message includes:
    an instruction indicating the availability of said updated software; and
    identification of one or more satellite channels from which the updated software can be downloaded.

15. The computer program product of claim 12, wherein said update message includes:
    information regarding the size of the updated software;
    identification of a version of the updated software;
    identification of a platform on which the updated software will operate; and
    verification details.

16. The computer program product of claim 12, wherein said consistency check comprises comparing data derived from the received updated software with data derived from the received update message.

* * * * *